Feb. 22, 1944.   J. D. O'BRIEN   2,342,616
LEAKAGE TESTING DEVICE
Filed Nov. 4, 1941
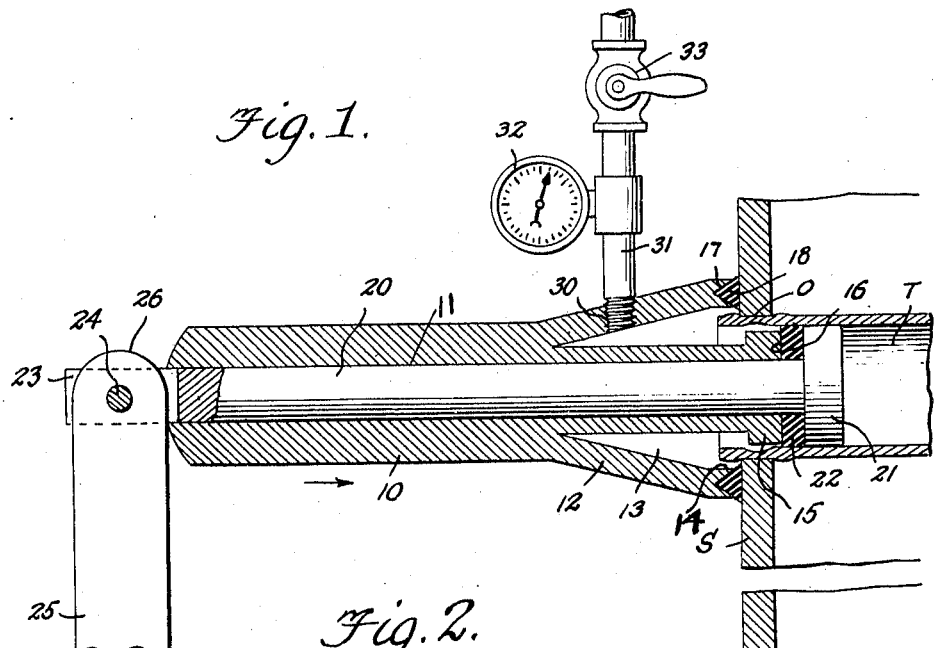
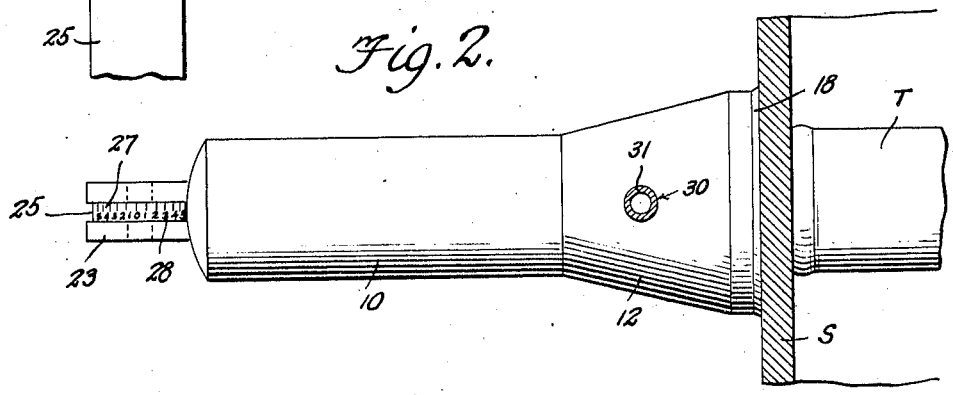
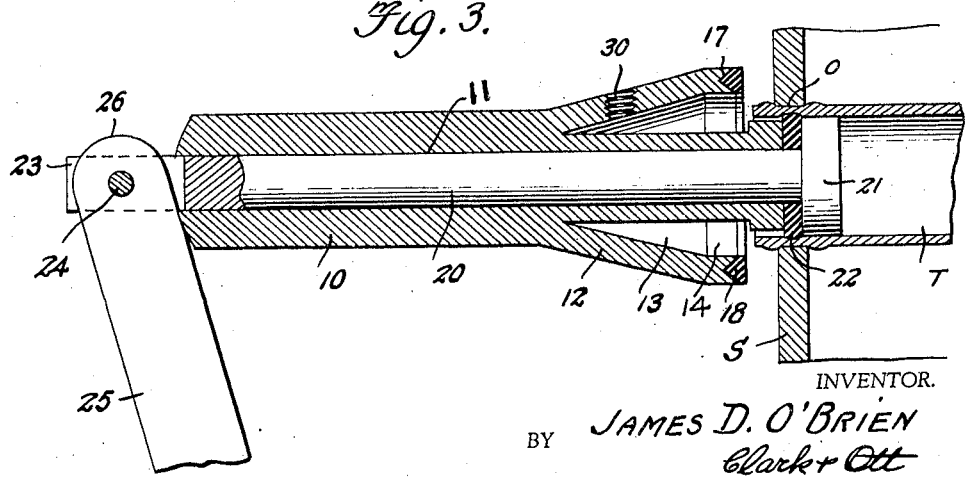
INVENTOR.
JAMES D. O'BRIEN
BY Clark & Ott
ATTORNEYS Patented Feb. 22, 1944

2,342,616

UNITED STATES PATENT OFFICE 2,342,616

LEAKAGE TESTING DEVICE

James D. O'Brien, Brooklyn, N. Y.

Application November 4, 1941, Serial No. 417,777

5 Claims. (Cl. 73—51)

This invention has relation to testing and gaging instruments which while not necessarily restricted thereto, is particularly designed for testing the tightness of joints between tubes and tube sheets such as those embodied in steam boilers or equivalent vessels wherein one or more tubes have their ends expanded in openings in the tube sheet, while the instrument is also useful as a means for gaging the extent of distortion of the tube as a result of the expansion of the same in the tube sheet opening by the "roll-in" operation.

The invention broadly comprehends a testing instrument of the indicated character which is so constructed and arranged as to permit of its ready association with a tube and tube sheet to seal the tube internally adjacent its end and to seal the tube sheet in surrounding relation to the tube receiving opening to thus provide a chamber at the joint for receiving a testing fluid under pressure and to thereby determine whether or not the joint between the tube and tube sheet is fluid tight.

As a further feature the invention contemplates an implement of the character described by virtue of which the extent of the distortion of the tube may be expeditiously and accurately determined at the region where the tube has been expanded within the opening in the tube sheet.

Other objects of the invention reside in the provision of a testing and gaging implement for the purpose set forth, which is extremely simple in its construction and mode of operation, which is comparatively compact and which is highly efficient for its intended purpose.

With the above enumerated and other objects in view, the invention is set forth in greater detail in the following specification and illustrated in the accompanying drawing, in which:

Fig. 1 is a longitudinal sectional view through an instrument constructed in accordance with the invention, illustrating the same in applied position to an assembled tube and tube sheet for testing the tightness of the joint therebetween.

Fig. 2 is a plan view thereof.

Fig. 3 is a view similar to Fig. 1, illustrating the instrument positioned for gaging the extent of distortion of the tube at the region where the same has been expanded within the tube sheet opening.

Referring to the drawing by characters of reference, the instrument includes a tubular, preferably cylindrical, shank 10 which defines a longitudinally extending bore 11 and is provided adjacent its inner end with a surrounding skirt 12 herein illustrated as frusto-conical and flaring outwardly towards said inner end to define a fluid pressure receiving space or chamber 13 having an open end 14 spaced forwardly from the end portion 15 of the shank which protrudes beyond the skirt and is of a diameter to freely enter the tube T and which end portion is formed with an end surface 16. The rear open end 14 of the skirt 12 is of a larger diameter than the tube receiving opening and is approximately concentric to the rear end portion 15 of the shank 10 and said rear end portion is formed with a continuous groove 17 in which is arranged a yieldable sealing gasket 18 protruding rearwardly from the groove for sealing engagement with the tube sheet S in surrounding relation to the tube sheet opening O.

The instrument further includes a stem 20 extending through the tubular shank 10 with the opposite ends thereof protruding from the shank. The inner end of the stem 20 is provided with a head 21 of a diameter to be freely received within the tube T and corresponding approximately to the diameter of the inner end portion 15 of the shank. A yieldable resilient sealing washer 22 is arranged between the head 21 and the inner end surface 16 of the shank in surrounding relation to the stem 20. The opposite forward or outer end 23 of the stem is bifurcated and has mounted between the furcations thereof on a pivot pin 24, a lever 25 having a concentric convex terminal 26 provided with a series of transverse graduations 27 and indicia 28 associated therewith for a purpose to be hereinafter set forth.

The skirt 12 is formed with a threaded aperture 30 extending substantially radially therethrough and into which is threadedly engaged the outlet end of a fluid pressure supply pipe 31 which is adapted to receive fluid under pressure from any suitable source of supply not shown. Interposed in the fluid pressure supply pipe 31 is a pressure gage 32 beyond which is a valve 33.

In use and operation of the instrument for the purpose of testing the tightness of the joint between the tube T and tube sheet S, the headed inner end 21 of the stem together with the resilient sealing washer 22 and the inner end portion 15 of the shank which protrudes beyond the open end 14 of the skirt, are inserted within the end of the tube until the sealing gasket 18 is engaged with the outer surface of the tube sheet S. The lever 25 is then swung downwardly to the position illustrated in Fig. 1. The initial downward movement of the lever effects a canting of the shank 10 and the stem 20 which causes the head 21 to bind in the tube T. Continued downward movement of the lever effects inward movement of the shank 10 as shown by the arrow in Fig. 1, thereby compressing the resilient sealing washer 22 between the inner end surface 16 of the shank and the outer surface of the head 21 of the stem resulting in a radial outward expansion of the washer 22 so that its periphery is annularly impinged against the interior of the tube T, while the resilient yieldable sealing gasket 18 is impinged against the outer surface of the tube sheet S in surrounding relation to the protruding end of the tube T and the tube sheet opening O. The fluid under pressure is then supplied through the pipe 31 by opening the valve 33 to charge the space or chamber 13 with the fluid until a predetermined pressure is indicated on the gage 32 and the valve is then closed. The operator, by means of the gage 32, may determine after an appropriate length of time if any drop in pressure occurs thus testing the joint between the tube and tube sheet for leakage. After the test has been made, the raising of the lever 25 will effect relative movement of the shank 10 and stem 20 in opposite directions and thus permit the washer 22 to contract radially inward for releasing the tool for repeating the test on other tubes.

In order to employ the instrument for gaging or measuring the degree of deformation of the tube in the region where it is rolled internally outward against the tube sheet opening O, the instrument is inserted as in Fig. 1 and the lever 25 swung downwardly until the resilient washer 22 is expanded into engagement with the inner surface of the tube beyond the rolled in portion. The graduation 27 is noted and the lever 25 is then swung upwardly into alignment with the stem 20 and the tool drawn outwardly until the washer 22 is in alignment with the rolled in portion, said tool being then held by hand in this position with the skirt 12 spaced from the tube sheet S as shown in Fig. 3. The lever 25 is again swung downwardly until the washer 22 is expanded radially outward with its periphery engaging the rolled in portion and the graduation 27 is noted to measure the difference from which the user may estimate the degree of deformation and if excessive rolling has occurred the tube may then be replaced.

The instrument may also be employed for the purpose of testing the tubes throughout their length for possible leakage. This is accomplished by sealing one end of the tube in any desired manner either with one of the instruments or with any other suitable device and then employing one of said instruments at the opposite end in the following manner. After first removing from the instrument the resilient sealing washer 22, the headed inner end 21 of the stem and the inner end portion 15 of the shank which protrudes beyond the open end 14 of the skirt are inserted within said opposite end of the tube until the sealing gasket 18 engages with the outer surface of the tube sheet S. The lever 25 is then swung downwardly, the initial movement thereof effecting a canting of the shank 10 and stem 20 so as to cause the head 21 to bind in the tube T. Further downward movement of the lever will thus effect an inward movement of the shank 10 causing the resilient yieldable sealing gasket 18 to be impinged against the outer surface of tube sheet S in surrounding relation to the protruding end of the tube T and tube sheet opening, thus sealing the fluid pressure receiving space or chamber 13 which is then in communication with the interior of the tube T due to the fact that there is a passage around the periphery of the head 21 by virtue of the absence of the sealing washer 22. By introducing fluid under pressure through the pipe 31, any leakage in the length of the tube T may be readily detected.

What is claimed is:

1. An instrument for testing the tightness of a joint between a tube and tube sheet having an opening within which the end of the tube is fitted, said instrument including a shank having means at the inner end for sealing the tube interiorly thereof adjacent the end fitted within the tube sheet opening, means adjacent the inner end of said shank defining an open ended fluid chamber opening towards the inner end of the shank, a common means for simultaneously effecting the sealing of the tube internally by said sealing means and the sealing of the open ended fluid pressure chamber with the tube sheet in surrounding relation to the tube receiving opening, and means for introducing fluid under pressure to said chamber and for gaging said fluid pressure.

2. An instrument for testing the tightness of a joint between a tube and a tube sheet having an opening within which the end of the tube is fitted, said instrument including a shank having at the inner end thereof expansible means for sealing the tube interiorly, means defining an open ended fluid pressure chamber carried by said shank adjacent said inner end with the open end disposed inwardly and formed with a yieldable sealing gasket protruding therefrom, means extending axially of said shank manually operable to effect the sealing of the tube sealing means and the impingement of the yieldable gasket at the open end of the fluid pressure chamber against the tube sheet in surrounding relation to the tube receiving opening to close the pressure chamber, and means for introducing fluid under pressure to said chamber and for indicating said fluid pressure.

3. An instrument for testing the tightness of a joint between a tube and tube sheet having an opening within which an end of the tube is fitted, said instrument including a tubular shank, a skirt surrounding one end of the shank and defining between the same and the shank a fluid pressure chamber having an open end spaced from the end of the shank, said skirt being provided at said open end with a gasket adapted for sealing engagement with the tube sheet in surrounding relation to the tube receiving opening, the protruding inner end of said shank adapted to be engaged within the tube, a stem extending through and protruding at the opposite ends from said tubular shank and having a head at its inner end, a resilient washer surrounding said stem and interposed between the inner end of the shank and the head of the stem, a lever pivotally attached to the outer end of said stem and swingable with reference thereto to engage with the end of the shank to impart relative longitudinal movement between the stem and shank for effecting compression of the washer between the inner end of the shank and the head of the stem and radial outward expansion of the washer to seal the tube internally and to effect sealing impingement of the skirt gasket with the tube sheet, and means for introducing fluid under pressure to said chamber and for gaging said fluid pressure.

4. An instrument for gaging the extent of distortion of a tube in the region of the expansion of the same within the opening of a tube sheet, said instrument including a tubular shank, a stem extending through and protruding at its opposite ends from said shank and having a head at its inner end, a resilient washer surrounding said stem and interposed between the inner end of the shank and the head of the stem, a lever pivotally attached to the outer end of said stem and swingable with reference thereto to engage with the end of the shank to impart longitudinal movement between the stem and shank for effecting compression of the washer between the inner end of the shank and the head of the stem and radial outward expansion of the washer to peripherally engage the tube internally, said lever having a convex end surface concentric with its pivotal connection with the stem and transverse graduations and indicia on said convex end surface for gaging the extent of radial outward expansion of the washer.

5. An instrument for testing boiler tubes in which said tubes are mounted in an end wall of the boiler and are sealed at the other end thereof, said instrument including a tubular shank having a skirt carried by and spaced from the outer surface of the shank at one end thereof, said skirt being open at one end and having a gasket carried by the end edge thereof, a stem mounted in the opening in said shank and having an enlarged head at one end adapted to be canted to grippingly engage within the unsealed open end of a boiler tube without sealing the same while functioning to anchor said end of the stem so as to dispose the skirt in surrounding relation with said tube, manipulating means pivotally carried by the stem at the opposite end and adapted to be impinged against the outer end of the shank for compressing the gasket between the skirt and the end of the boiler for sealing the juncture of the skirt with the end of the boiler and enclosing the end of the tube within the skirt, and means for introducing pressure within the skirt and throughout the length of the tube for gaging the fluid pressure therein.

JAMES D. O'BRIEN.